United States Patent
Krause

(10) Patent No.: US 8,095,875 B2
(45) Date of Patent: Jan. 10, 2012

(54) METHOD AND APPARATUS FOR CONSOLIDATING NETWORK INFORMATION

(76) Inventor: Philip R. Krause, Bethesda, MD (US)

( * ) Notice: Subject to any disclaimer, the term of this patent is extended or adjusted under 35 U.S.C. 154(b) by 1317 days.

(21) Appl. No.: 10/176,634

(22) Filed: Jun. 24, 2002

(65) Prior Publication Data

US 2002/0196273 A1 Dec. 26, 2002

Related U.S. Application Data

(60) Provisional application No. 60/299,749, filed on Jun. 22, 2001.

(51) Int. Cl.
*G06F 17/00* (2006.01)
*G06F 17/20* (2006.01)
(52) U.S. Cl. ......... 715/273; 715/255; 715/778; 715/225
(58) Field of Classification Search .................. 715/500, 715/500.1, 501.1, 513, 515, 517, 522, 733, 715/760, 788, 800, 215, 273, 778, 225
See application file for complete search history.

(56) References Cited

U.S. PATENT DOCUMENTS

| | | | | |
|---|---|---|---|---|
| 6,327,628 B1 * | 12/2001 | Anuff et al. | | 719/311 |
| 6,832,355 B1 * | 12/2004 | Duperrouzel et al. | | 715/788 |
| 6,961,586 B2 * | 11/2005 | Barbosa et al. | | 455/556.1 |
| 7,131,062 B2 * | 10/2006 | Nguyen et al. | | 715/201 |
| 7,162,519 B2 * | 1/2007 | Jenkins | | 709/219 |
| 7,509,330 B2 * | 3/2009 | Ewing et al. | | 1/1 |
| 7,603,382 B2 * | 10/2009 | Halt, Jr. | | 1/1 |
| 2002/0012010 A1 * | 1/2002 | Pasquali | | 345/719 |
| 2002/0083208 A1 * | 6/2002 | Abdelnur | | 709/310 |
| 2002/0165967 A1 * | 11/2002 | Morgan | | 709/227 |
| 2002/0194267 A1 * | 12/2002 | Flesner et al. | | 709/203 |
| 2003/0069944 A1 * | 4/2003 | Barlock et al. | | 709/220 |
| 2004/0003096 A1 * | 1/2004 | Willis | | 709/228 |
| 2005/0204276 A1 * | 9/2005 | Hosea et al. | | 715/501.1 |
| 2011/0022711 A1 * | 1/2011 | Cohn | | 709/225 |

OTHER PUBLICATIONS

"Internet Scrapbook: Automating Web Browsing Tasks by Demonstration", Atsushi Sugiura & Yoshiyuki Koseki, Nov. 1998, Proceedings of the 11th annual ACM symposium on User interface software and technology, ACM Press, pp. 9-18.*
Rossi et al.,"Designing Personalized Web Applications", ACM, 2001, pp. 275-284.*
Kowalkiewicz et al.,"myPortal: Robust Extraction and Aggregation of Web Content", ACM, 2006, pp. 1219-1222.*

* cited by examiner

*Primary Examiner* — Doug Hutton, Jr.
*Assistant Examiner* — James Debrow

(57) ABSTRACT

A method and apparatus for consolidating network information, in some cases for use as a start/portal page. The invention provides means for "framing" Internet content, as well as creating links on the fly, to a single start/portal page that can be accessed by a single user, or by a set of users in a cooperative relationship with each other.

24 Claims, 14 Drawing Sheets

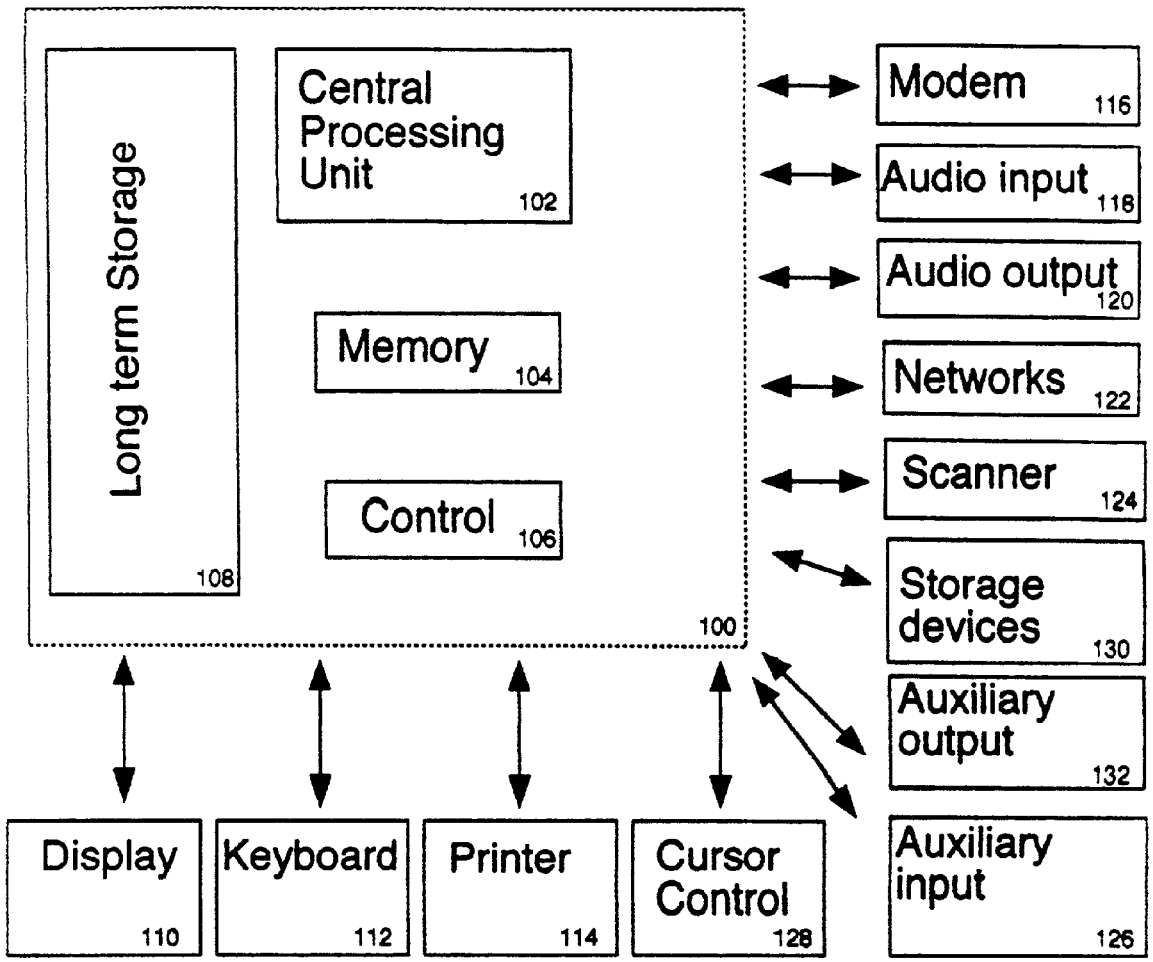
FIGURE 1a Computer system

METHOD AND APPARATUS FOR CONSOLIDATING NETWORK INFORMATION

This patent application claims priority to provisional application No. 60/299,749 (filing date, Jun. 22, 2001), the entirety of which is incorporated herein by reference.

BACKGROUND OF THE INVENTION

1. Field of the Invention

This invention relates generally to the fields of information processing and display by computers, and human-machine interfaces for computers. The present invention further relates to providing the user with improved control over the way that material is displayed, accessed, and reaccessed through networks, particularly the Internet.

2. Description of the Background Art

In the current art, Internet web sites of interest to a user are located at multiple different network locations. For many users, it is inconvenient to access these sites, as they may not all be accessible from a single network location such as a start page or existing portal page. To improve the accessibility of information on the Internet, it would be useful to enable an average user to create her own portal page.

When a user accesses the Internet through a browser, the user is immediately directed to a "start page" that has been prespecified by the user or has been selected by default. At any given time, this "start page" might or might not provide information or direct access to information that is relevant to the reason the user decided to initiate an Internet access session.

Users of the Internet have only minimal control over the contents of their start page or portal page. Unless they have skill in the art of HTML and Javascript programming and can develop a start/portal page that contains precisely the elements that they desire, and have access to a web server that can make this page available to them regardless of what computer they choose to use to access the Internet, the start/portal page that is available to most users does not fulfill the needs of the users.

Moreover, even if a user is capable of programming and making her own start/portal page available over the Internet, said user is not able to easily and quickly make changes to the layout and contents of that page, without modifying the page in a text editor and re-loading the contents of the entire page to the server.

Also, no method is provided in the current art for adding new desired material directly from a different location on the Internet, making it necessary to explicitly type in information necessary to identify the start/portal page content.

Moreover, users not intimately familiar with the Internet may not be able to make informed decisions about what material to select to appear on their start/portal page. No method in the current art provides a way to take advantage of the collective understanding of a community of web users to customize a start/portal page in accordance with the experience of the community and the desires of an individual user.

The current art also provides no means to "frame" content from other web sites on a start/portal page in a way that provides the user useful access both to the "framed" content and to other content or links selected by the user.

The current art provides no means to resize material framed from other web sites, or to pre-scroll such framed content to a desired web page location.

The current art provides no repository of start/portal pages specifically tailored to users of specific backgrounds or with specific interests.

The current art of customizable start/portal pages provides no mechanism to display an unlimited number of items on a start/portal page (which may include links, menus, framed content, images, text, or material that would otherwise require the user to fill out a form), such that any predefined desired page is accessible to a user with zero or one click.

Further, in the current art, a person or group of persons conducting Internet research on a specific topic has at best imperfect options for recording his or her research. While the computer that the user does the research on might be capable of storing the websites visited by the user in a retrievable manner, either by use of a "favorites" function or a "history" function, this information is not readily available to users from a remote computer. In addition, these functions do not provide an easy means for identifying the significance of stored links, or even associating the stored links with a specific research project.

Therefore, there is a need for an improved customizable start/portal page for Internet users, as well as an improved method for keeping track of websites visited for research purposes.

OBJECTS AND SUMMARY OF THE INVENTION

The present invention comprises a web site that provides additional functionality over existing Internet start pages and portal pages, and provides research support capability not found in the prior art. The following objects are achieved by some, but not necessarily all embodiments of the invention. The scope of the invention should be determined with reference to any allowed claims.

One object of an embodiment of the invention is to enable a user to completely customize a "start/portal page" which is available using any browser from any location on the Internet.

Another object of an embodiment of the invention is to enable a user to construct and customize a start/portal page essentially from scratch, as opposed to starting the customization process from a default page.

Another object of an embodiment of the invention is to enable a user to "frame" material from other web pages on her customized start/portal page.

Another object of an embodiment of the invention is to enable a user to resize framed material from other web pages on her customized start/portal page.

Another object of an embodiment of the invention is to enable a user to pre-scroll framed material from other web pages to a desired location on her customized start/portal page.

Another object of an embodiment of the invention is to enable a user of a web page to resize framed material on that web page Another object of an embodiment of the present invention is to avoid placing a limit on the number of text links displayed on a start/portal page, and to enable a user to access any preselected desired page on the Internet with zero or one click.

Another object of an embodiment of the invention is to enable a user to add a link to (or to frame content from) another web site to her customized start/portal page with a single click from said web site.

Another object of an embodiment of the invention is to enable a user to view the collective experience of other users of the start/portal page service to provide information regarding the most useful material to place on her start/portal page.

Another object of an embodiment of the invention is to provide a community of users the ability to create start/portal pages (or research pages) that are open to the public, thereby giving the public the benefit of their experience and research.

Another object of an embodiment of the invention is to enable a user to change the layout and contents of her start/portal page via a computer network.

Another object of an embodiment of the invention is to provide a user a means for storing links to important web sites visited during a research session on a web page accessible from any computer with Internet access.

Another object of an embodiment of the invention is to support a group of users working on a joint project involving Internet research, by providing means for storing links to important web sites on a web page accessible to all members of the group.

Another object of an embodiment of the invention is to provide a researcher the ability to make a collection of links relating to a specific research issue public.

Another object of an embodiment of the invention is to provide the operator of the web site with an opportunity to earn income based on referral of users to e-commerce and other sites that participate in affiliate programs.

Another object of an embodiment of the invention is to provide the operator of the web site with an opportunity to target advertising to users, based on the interests they have indicated through their choice of links and frames to place on their start/portal page.

The present invention, as broadly described herein, provides an Internet web site that consolidates information available on a computer network onto a single display page. More specifically, an embodiment of the invention accomplishes this by associating a name with the display page, storing information related to the display page at a first network location, providing a user the ability to control access to the display page, and in response to user action while accessing material from a second network location, retrieving from a user the name associated with said display page, and associating with said named display page the network address of said second location. The embodiment of the invention also associates a screen location with said network address of said second location and provides network access to said second location from said display page.

Additional objects and advantages of the invention are set forth in part in the description that follows, and in part are obvious from the description, or may be learned by practice of the invention. The objects and advantages of the invention may also be realized and attained by means of the instrumentalities and combinations particularly pointed out in the appended claims.

This invention is enabled by the current art of computer programming, which enables a computer programmer of ordinary skill to perform the programming steps necessary to implement this invention with reference to this description and the accompanying drawings.

BRIEF DESCRIPTION OF THE DRAWINGS

The accompanying drawings, which are incorporated in and constitute part of the specification, illustrate preferred embodiments of the invention, and, together with the description, serve to explain the principles of the present invention. In the drawings, like reference numbers indicate identical or functionally similar elements. Additionally, the left-most digit(s) of a reference number identifies the drawing in which the reference number first appears.

FIG. 1a presents a block diagram of a computer system as may be utilized by an end user of an embodiment of the present invention.

DETAILED DESCRIPTION OF EMBODIMENTS

Figure 1B:
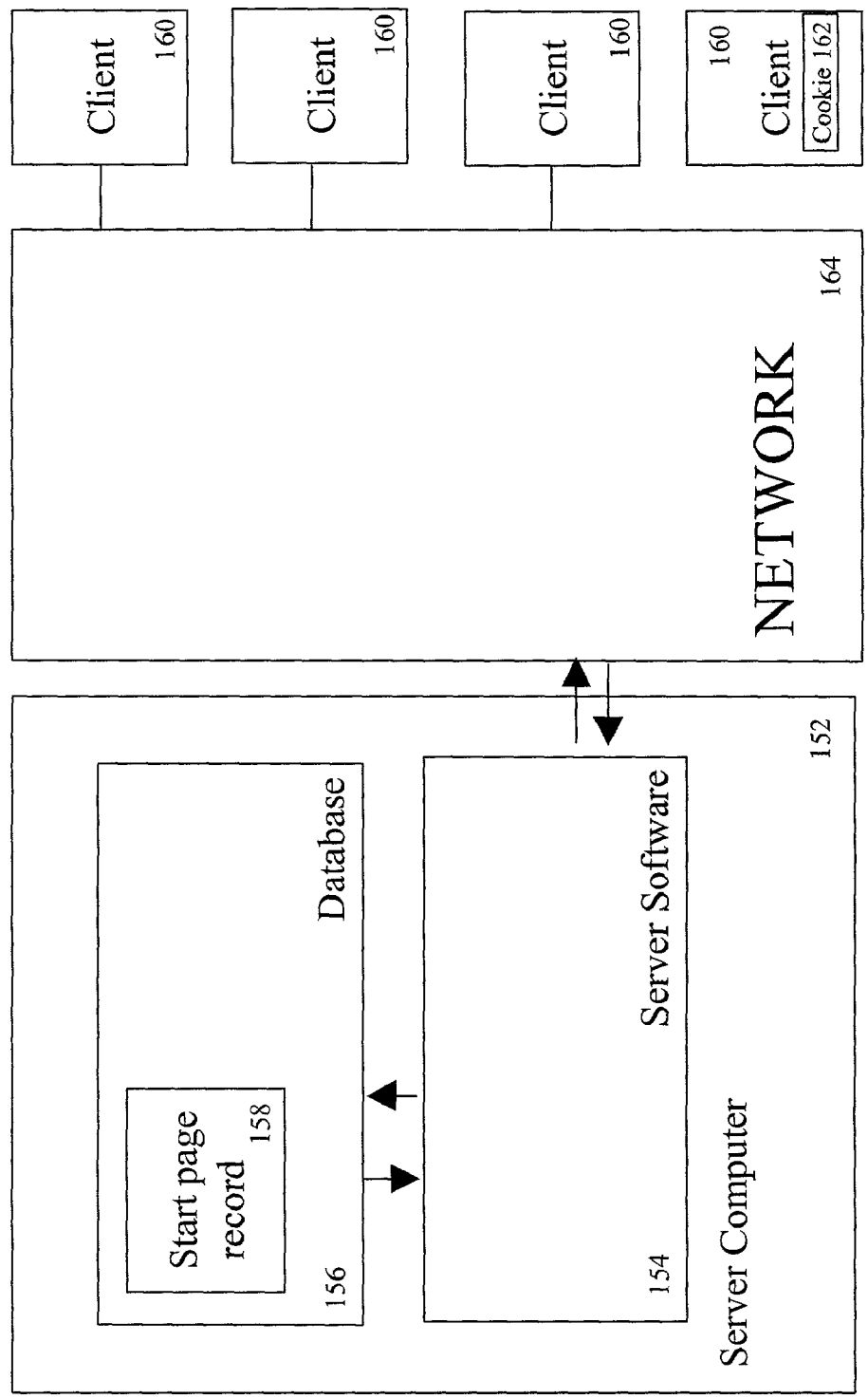
FIG. 1b presents a block diagram of a server as may be connected to the Internet and used by the operators of the web site of an embodiment of the present invention.

Reference will now be made in detail to the present preferred embodiments of the invention, examples of which are illustrated in the accompanying drawings. The steps required to practice this invention are readily accomplished by a person of ordinary skill in the art of computer programming and hardware design, with reference to this description and the accompanying drawings.

The term "start page" generally refers to a page that is seen by a user when initiating a network session. On the Internet, the start page typically appears when a session begins (unless the session begins by clicking on a hyperlink, such as might appear in an email or other document), and can typically be accessed by clicking on the "Home" button on the user's browser bar. Any start page may also be used as a portal page, and in this description, these terms are often interchangeable.

The term "portal page," as used herein, refers to any network page that contains one or more links to other network pages. Start pages created pursuant to this invention will typically contains at least one link, and thus will typically be a species of portal page.

The invention is described in the context of a computer system (100), as pictured in FIG. 1a, which consists of a Central Processing Unit (102), memory and/or storage (which may include random access short term memory [104] or long-term storage such as a hard disk or other disk drives [108]), a Control function (106), and, a display device such as a monitor (110), and one or more cursor control devices (128). In addition, such systems may contain additional means for input such as a keyboard (112), auxiliary input (126) and storage devices (130), including scanners (124), audio input such as a microphone (118), audio output such as amplified loudspeakers (120), and access to other computer systems, including the Internet, via modem (116) or networks (122) (including wireless connections). The various embodiments are described in the context of a computer system which is capable of running programs in a Windows® environment with the Internet Explorer browser.

An embodiment of the present invention comprises a web site that provides a user the ability to create a start/portal page with additional functionality over existing Internet start/portal pages. In one embodiment, the user configures her Internet browser such that clicking on or otherwise selecting the "home" button causes her customized start/portal page to appear on her computer screen. It also is generally possible to reach the customized start/portal page by typing the URL of the web site providing the customized start/portal page into the browser, or by following Internet links to the customized start/portal page that may be provided by other web sites.

In a preferred embodiment, a customized web page having the functionality of the described start/portal page is not necessarily used at the beginning of a network session, and may be used as a more general network portal page.

FIG. 1b shows an implementation of this invention using a server 152, a database 156, the Internet 164, and a user's computer (the client, 160). In one embodiment, a user is able to completely customize a "start/portal page" which is available using any browser from any location on a network 164, which may be the Internet. Alternatively, start/portal pages may be served over a local area network or other network. Said start/portal page can be stored on a server 152 that is capable of providing the start/portal page to a location 160 that can access the network 164. A server comprises one or more computers that provide information over a network. In one embodiment, when the web site is accessed from a remote site, the user's computer may signal the web site whether or not a start/portal page has yet been configured, based on the presence or absence of "cookies" 162 stored on the remote client computer 160. If a start/portal page has been configured, the appropriate start/portal page is identified by reference to information stored in the form of cookies on the remote computer, and it is displayed to the user. In one embodiment, the information stored in these cookies can include a user identification and password that are required to access the start/portal page. If no start/portal page has yet been configured, the user is invited to create one or to type in information required to access a start/portal page already configured from a different computer, thus creating the cookies necessary to use the web site in this embodiment.

Figure 2:
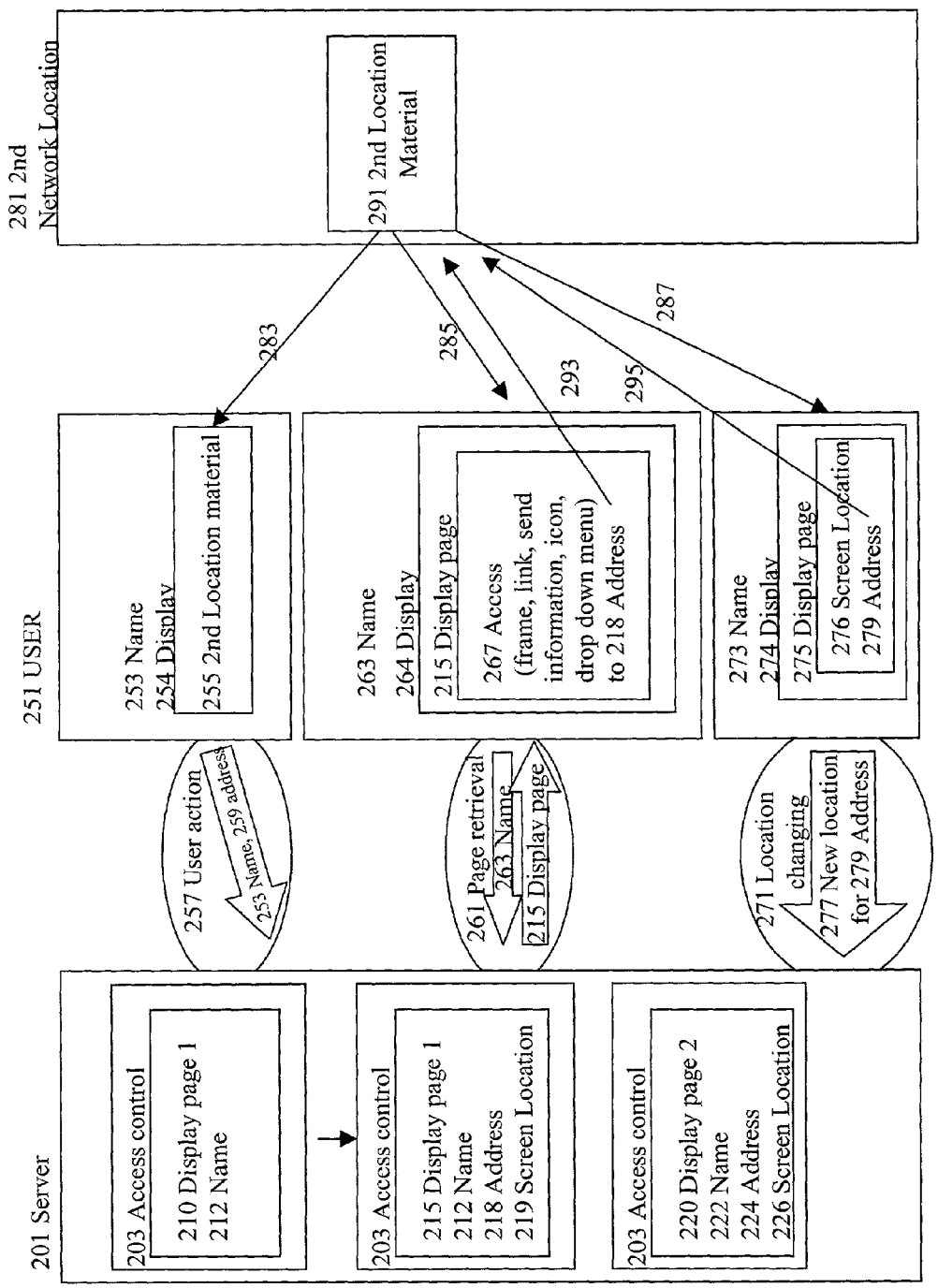
FIG. 2 presents a diagram of interactions between various network locations and a user of an embodiment of the invention.

In one embodiment, information concerning the location and types of links on a start/portal page is stored in a database 156 accessible to the server 152 as depicted in FIG. 2. Access to this database may preferably be performed via a CGI (common gateway interface) program that interacts with the server to either send information to the database for storage or retrieve information from the database for inclusion in a web page. In one embodiment, each link on a user's start/portal page is represented by a separate database entry 158, such that adding a link to a given start/portal page involves adding an entry that includes the user identification and the URL of the link to this database. Deletion of a link involves deleting this entry from the database. In one embodiment, each link entry in this link database also includes information regarding the desired screen location, size, and other special properties of the link (for example, whether it is framed or not). In one embodiment, this database may be implemented in Filemaker Pro. In another embodiment, information about a user's start/portal page may be stored in a hypertext markup language file.

FIG. 2 presents a diagram of interactions between a server 201, a user 251, and a second server at a different network location 281 that may take place in a preferred embodiment of this invention. The server 201 stores information related to a display page 210 or 220 at a first network location. A name 212, which can be provided by the user, is associated with this display page. A user 251 has the ability to control access to the display page via an access control method 203, such as password protection. When the user's computer display 254 shows material 255 from a second network location 281 (corresponding to 291 on the second server, access shown via arrow 283), the server 201 responds to user action 257 (which may comprise a mouse click on a browser bar, selection of an Internet favorite or shortcut, or other signal to the computer) by retrieving the name 253 associated with a display page, and associating with the named display page the address 259 of the second network location (corresponding to 281). The term address encompasses Internet protocol addresses, uniform resource locators, or other identifiers that may be used to locate material on a network or strings or numbers that correspond to said identifiers. The association between the address and the name is used to provide access to material from the second network location while viewing the display page. Additional information related to this display page or network address may also be provided by a user at this or a later time. The server 201 also associates a screen location with said address, such that the screen location is the location on the display page where material corresponding to that address is displayed. In performing these steps, the record of said display page 210 is changed to include the information shown as display page 1 (215). Multiple addresses 218 and screen locations 219 may be associated with a display page 215, permitting a display page to include information stored on more than one network server or links to several different network servers, or information selected by different users. A user 251 may retrieve said display page 215 by providing its name 263 to the server 201, and satisfying the conditions of access control 203. That page 215 may then be shown on his computer display 264. This display page 215 now contains access to the network information at the specified address 218 at the screen location 219. In an embodiment, this access 267 (via arrow 293) may include presentation of access-related information such as a link to the second network location 281, direct presentation of framed information 291 located at the second network location 281, presentation of a icon or picture representing a link to the second network location 281, or a drop down menu that includes a link to the second network location 281. A user also may have the opportunity to send information via HTML forms or parameters in URLs to the second network location 281.

In an embodiment, it is possible to change the location of access-related information displayed on a display page 215 by providing a new location 277 to be associated with address 279. This new location may be specified by the user by dragging the material to a new preferred location. In an embodiment, a single user may create, control access to, and use several display pages (for example, 210 and 220).

Figure 3:
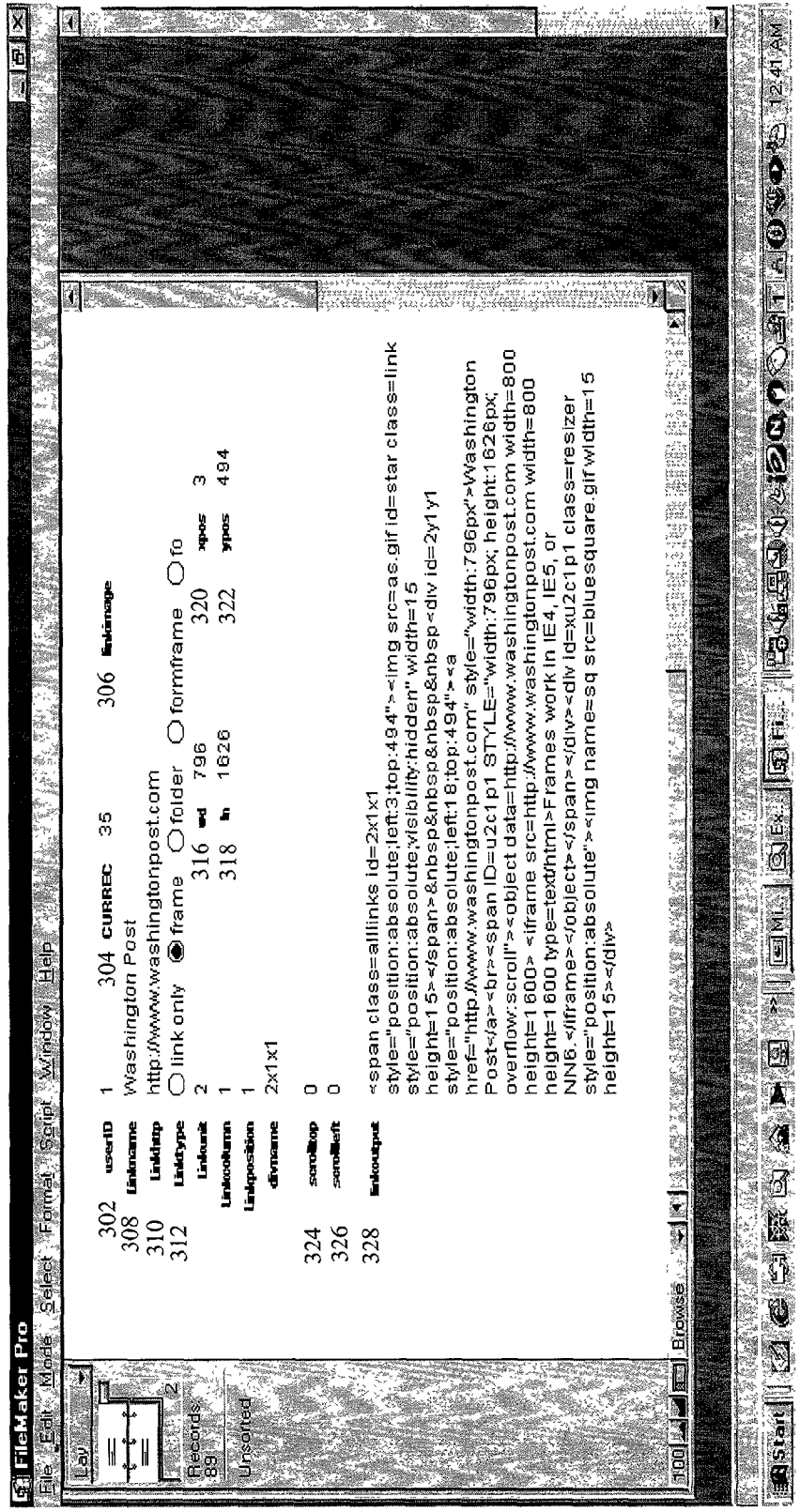
FIG. 3 presents a typical database entry that could contain information displayed on the customized start/portal page of a user of the web site of an embodiment of the invention.

FIG. 3 presents a typical Filemaker Pro layout that corresponds to an entry 158 on a start/portal page. In this layout, userID 302 corresponds to the user whose start/portal page this entry is on. Linkimage 306 is a path to an image that may be displayed in conjunction with this entry, Linkname 308 is text that is displayed in conjunction with a "link" associated with this entry. Linkhttp 310 is the uniform resource locator (URL) to which the browser is to be directed if the link is selected. In some embodiments, it is also possible to link to other files on a host computer or a network, including executable files. In these cases, a link may be analogous to a Windows shortcut or a Macintosh alias. Linktype 312 corresponds to the type of link; in this example a frame that displays the contents at the location of Linkhttp 310 will be created in the browser, in this example optimized for Microsoft Internet Explorer. Wd 316 corresponds to the width (in this case, in pixels) of the specified frame, and In 318 corresponds to its length (or height). Xpos 320 corresponds to the horizontal positioning of the entry on the start/portal page, while ypos 322 corresponds to the vertical positioning of the entry on the start/portal page. Scrolltop 324 and Scrollleft 326 specify whether (and how much) the frame is to be pre-scrolled when the start/portal page is loaded, in vertical and horizontal directions, respectively. Linkoutput 328 demonstrates typical HTML code that could be provided to the browser to effect this framed entry. In an alternative embodiment, this code is generated by the browser (for example, using a javascript program) with reference to the described parameters. In another embodiment, code such as that shown as linkoutput 328 represents the entire database entry, and the displayed individual parameters may be extracted from this entry. In another embodiment, the information necessary to display the start/portal page is encoded entirely in HTML, and the use of a database program to retain information about a page is bypassed.

Figure 4:
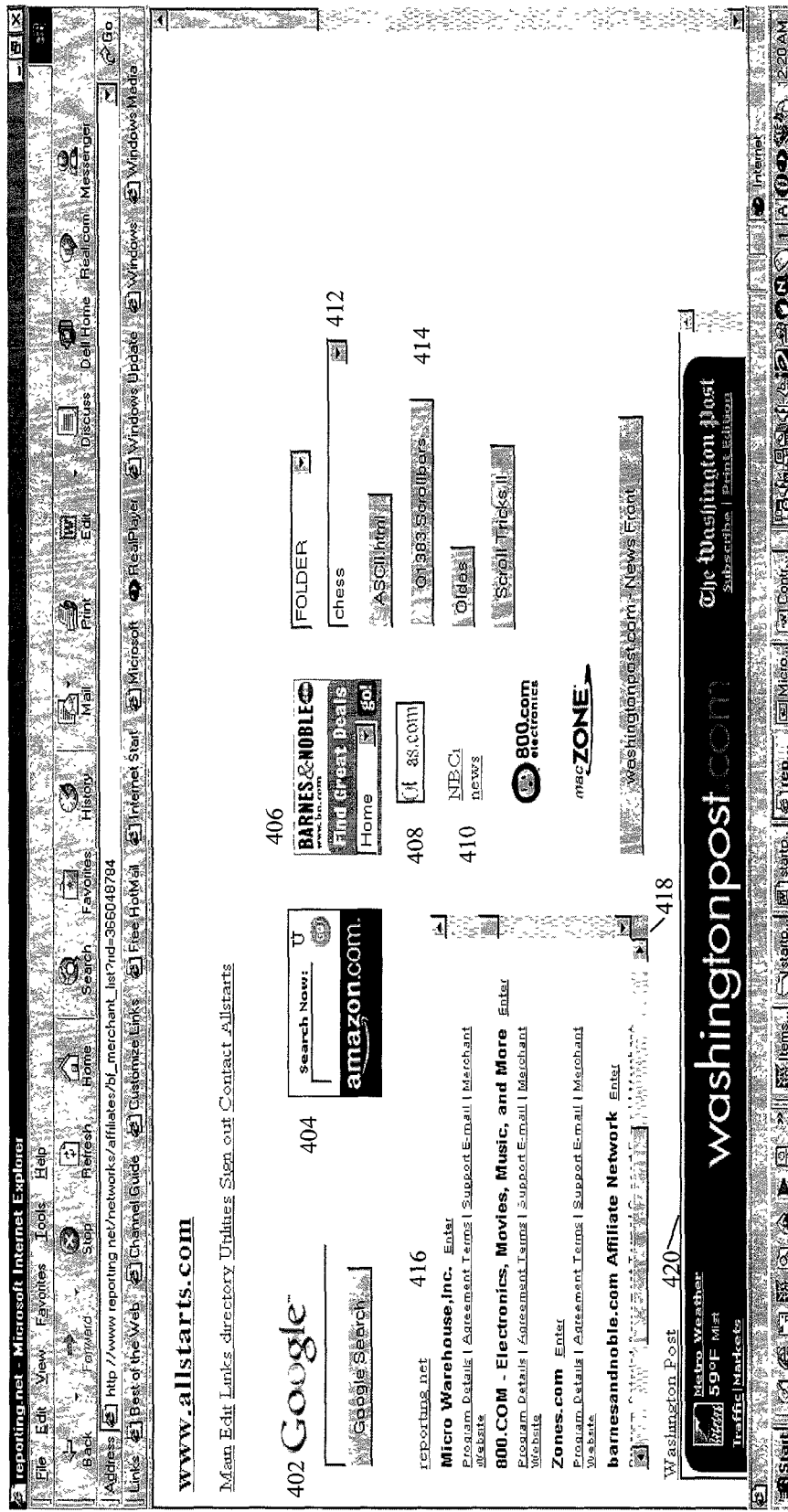
FIG. 4 presents a typical "start/portal page" as may be provided by the web site of an embodiment of the invention.

FIG. 4 presents a typical "start/portal page" as may be provided in an embodiment of the invention. Thus, on the "start/portal page" associated with a given user identification (e.g., userID 302), a series of entries (comprised of links or frames) are presented according to the desires of the user, such that clicking on a link directs the browser to the web site referred to by that link, and such that looking at a frame permits the user to see the material on the web page that is being framed.

In one embodiment, a user may "frame" material or information from other web pages on her customized start/portal page. This "framed" material may have any size and include any material available over the Internet. A "frame" is a location on the web page that contains material imported from elsewhere on the Internet. Because the user of the start/portal page selects the material to be "framed", it is always clear to the user that this material comes from outside the web site. Moreover, arguments by copyright holders that the user could be misled by framing of copyrighted material are specious, since it is the user who makes this decision. This functionality is of great utility to users who are transitioning to the use of a customized start/portal page, because it enables them to continue to use their currently existing start page (by framing it), while adding links or other material to the same page. Currently available HTML tags, as described in the World Wide Web Consortium (W3C) HTML 4.0 specification (such as the <IFRAME> and <OBJECT> tags) that are interpretable by major web browsers can be used by a programmer with ordinary skill in the art to permit the framing of material from other web sites. (A picture of a sample page containing framed material as specified in FIG. 3 is shown as 420—a frame of the Washingtonpost.com website—in FIG. 4). In one embodiment, these frames may be sized or scrolled as the user desires, and can be set to appear at a desired size and scroll position on a user's start/portal page.

Currently used programming technique does not readily permit re-sizing of framed content from other Internet pages. When the cursor is dragged over "framed" content, current Internet browsers assume that it is no longer over the original page, thus making it difficult to drag the margins of a frame into the framed content, with the intent of resizing it to be smaller. In one embodiment, this limitation of the prior art is overcome by placing a small image (418) in the framing web page at the lower right hand corner of the framed material, to serve as a resize button, such that when this image is dragged over the framed content, the browser recognizes it as part of the framing web page, rather than part of the framed page, and permits recalculation of the desired width and height of the framed page. In a preferred embodiment, the user has the option of saving changes to the size or scrolling of a frame for subsequent sessions.

In one embodiment, the invention provides a mechanism to display an unlimited number of text links on a start/portal page, such that any predefined desired page is accessible to a user with zero or one click. By providing a customizable graphical interface to the Internet that includes the option of adding any desired number of links to other pages or frames of other pages, the invention enables the user to access any desired web site within zero (in the case of framed sites, 416 or 420) or one (in the case of linked sites 408 or 410) click from her start/portal page. The potential to submit information, either as a component of a site-provided entry that may correspond to the links demonstrated in FIG. 8, such as 402, 404, or 406, or by filling out a form within a framed page such as 416 is also provided. As depicted in FIG. 4, text links may take the form of buttons 414, and may also take any other form known in the art. In creating the text link, the user has the option of giving a name to the link that may be an abbreviation of the actual name of the linked web site.

In one embodiment, the user may create drop-down menus such as 412, which conserve space on a start/portal page. These drop down menus normally do not show their contents, but only show their title. When the title is clicked, the contents become visible. Links to other sites may be added to a drop down menu, such that when these links are selected, the browser changes its location to the specified web page. Such links may either be added directly to a menu, or may be moved to a menu from another location on the start/portal page. In one embodiment, the invention may reduce an entire other web site to a series of drop-down menus, providing only the links and descriptors to permit a user of the start/portal page to rapidly access sites linked by the other web site. In another embodiment, the links extracted from another web page are presented using other access means, such as those described elsewhere in this specification.

Figure 5:
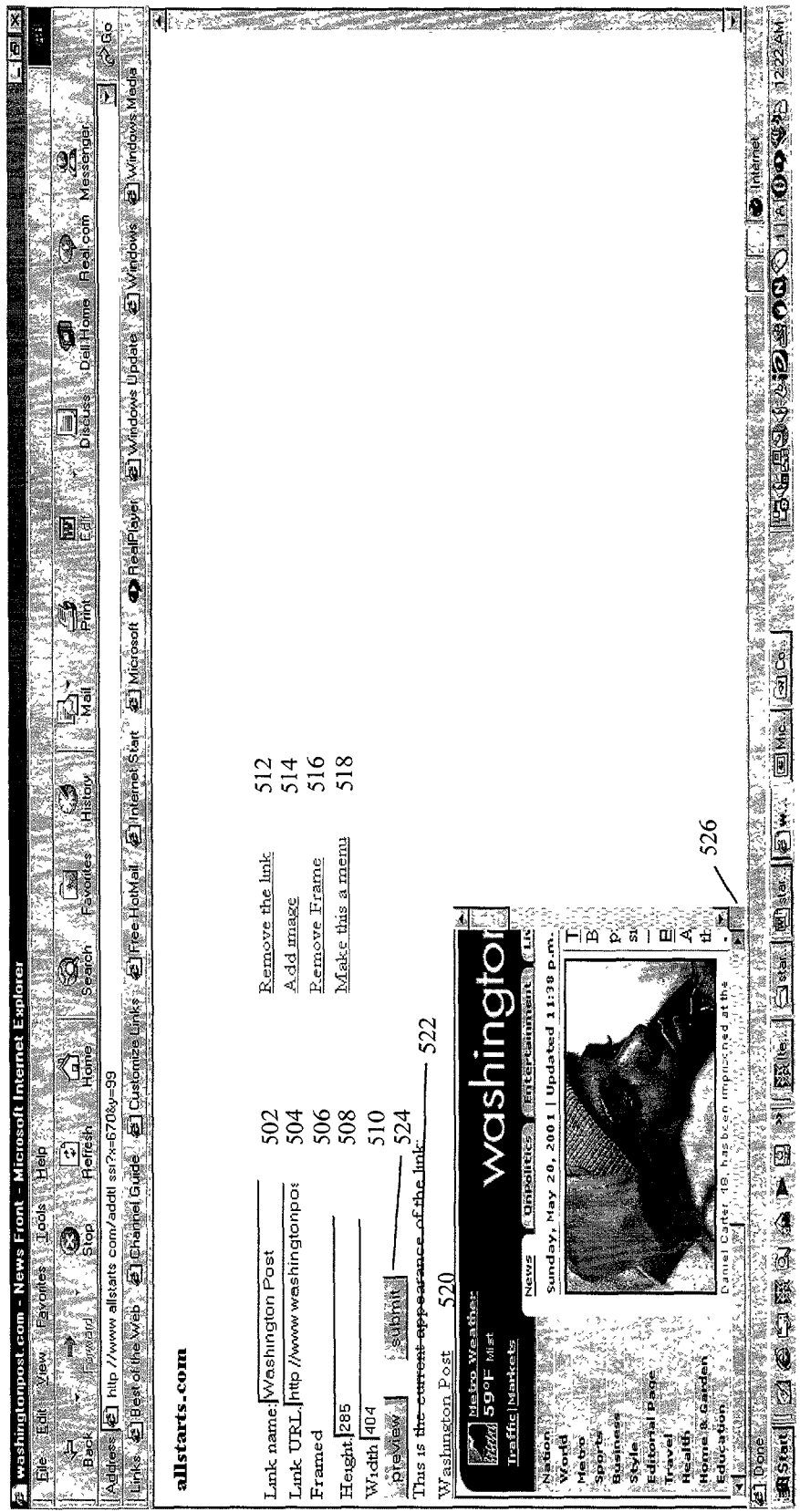
FIG. 5 presents a web page that can be used to add links or information to a customizable start/portal page.

FIG. 5 demonstrates a web page that is used to enter specifications about information to be included on a start/portal page. This web page accepts input such as the name by which the link is known 502 (corresponding to 308), the uniform resource locator corresponding to the link 504 (corresponding to 310), and information about the height and width of an associated frame or image (508 and 510, corresponding to 316 and 318). Further options such as 514 specifying an associated image, 512 removing the link (such that only text specified by Link name 502 is displayed at this location on the start/portal page), 516 specifying whether or not the material is to be framed, or 518 creating a menu with the specified Link name 502 are also provided. By selecting preview 522, the actual appearance of the specified link (520) on the start/portal page may be viewed. If material is framed as a part of the link, it may be pre-scrolled by moving the horizontal and vertical scrollbars shown in the window 520 to the desired position. Frames or images may also be resized either by typing in numeric values for height 508 and width 510, or by dragging the resize icon 526 to indicate a desired height and width (in which case the numeric values of height and width are recalculated to correspond to the height and width of the previewed frame). In a preferred embodiment, incomplete information included in the Link URL 504 directs the web site to display a selection of possibilities. For example, typing in "washingtonpost" provides the user with the option of selecting from different web sites that contain the name "washingtonpost", including http://www.washingtonpost.com, http://www.washingtonpost.biz, http://washingtonpost.com, etc. In a preferred embodiment, the typed-in Link name 502 or the typed-in Link URL 504 may serve as input to a search engine, from which potentially relevant results may be selected for inclusion directly on the user's start/portal page.

Figure 6:
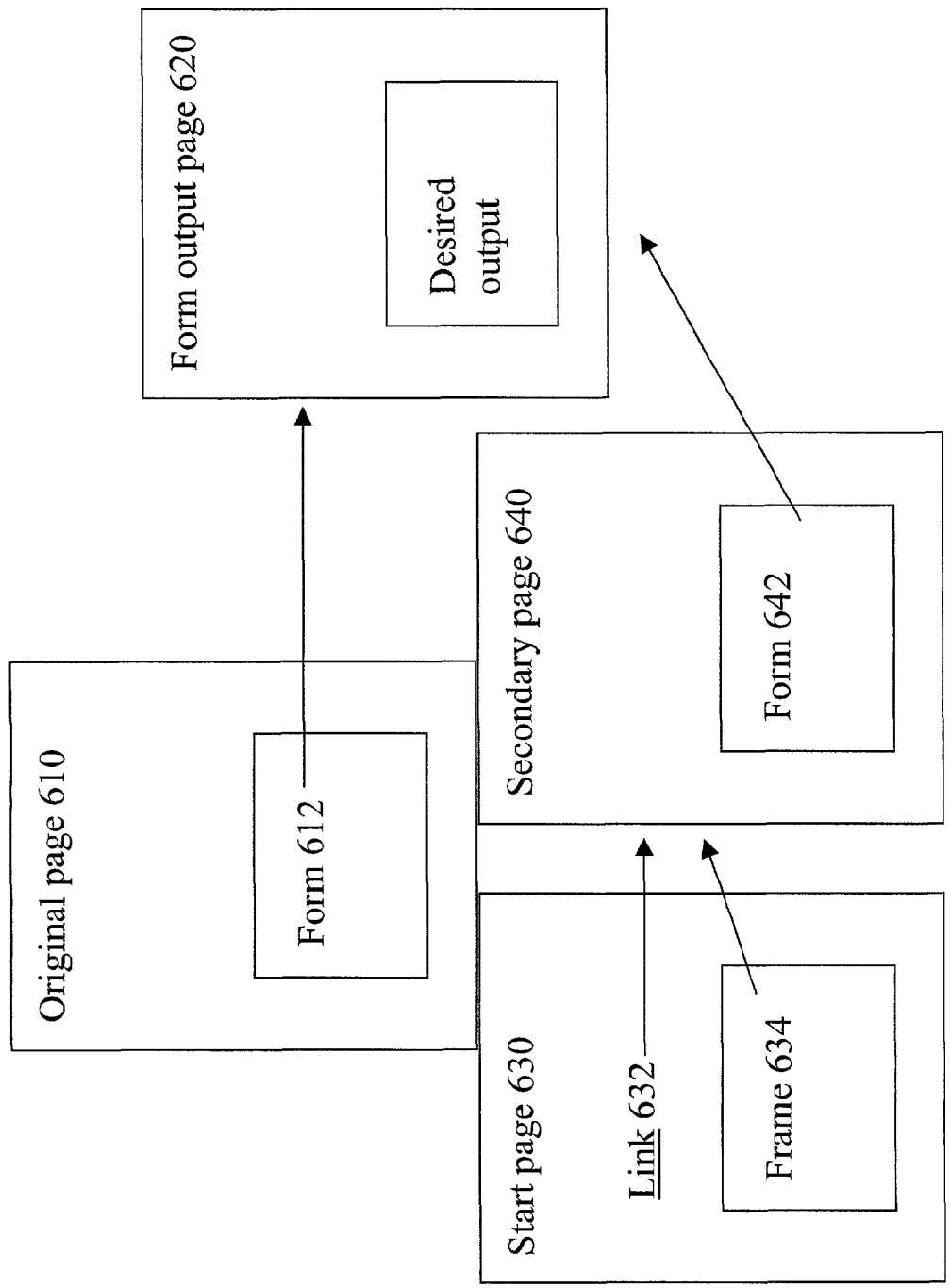
FIG. 6 presents a flowchart, demonstrating steps that may be taken by an embodiment of the invention permitting display on a customizable start/portal page of content normally shown only after submission of form data to a web site.

In one embodiment, the user may create links that interact with forms that are present on web pages. FIG. 6 shows one embodiment of this feature. In normal Internet browsing, when visiting page 610 of the remote web site, providing appropriate values for the parameters on an Internet form 612 displayed on page 610 would direct the browser to a new web page 620. In order to mimic the effect of filling out the form 612 in the context of the web site of the invention, the web site of the invention may obtain information about these parameters and values. To do so, the web site of the invention may display a copy of the relevant form 612 from a remote web site 610 to the user. This copy may be generated by the server of the invention, which extracts the form parameter information from the remote web page 610, or alternatively the source code for the web page 610 is provided to a program (for example, one encoded in javascript or Java) that is run on the user's computer, that extracts the appropriate parameters and generates a copy of the form. This permits the user to fill out a copy of the form 612 while visiting the website of the invention, and thus to provide the invention information regarding the values to be associated with the parameters that are necessary for filling out an Internet form 612 on a remote web page 610. These parameters and values are stored on the invention's server. The invention may then dynamically or statically create a new web page 640, which, when accessed, automatically submits the specified information in this form 612 (mimicked as 642) directly to the remote web site, creating a link to the remote web site's result page 620 that bypasses the remote page 610 and the original remote form 612. A link 632 that immediately provides the desired result 620 may be placed on a start/portal page 630, by linking 632 to the new web page 640, that in turn auto-submits the information to the remote site, providing the result 620. Links may thus be created on the user's start/portal page that automatically provide the linked web site with the information requested in the form, and link the user directly past a form from her start/portal page. Alternatively, this linked content (past a form) may be provided in a frame 634 on a user's start/portal page, that simply frames the content of the page 640, which is immediately replaced after submission of the form information with the remote page 620 (still in the context of a frame, visible on the user's start/portal page). In one embodiment, these capabilities are provided in the context of a secure server, with encryption capable of preventing theft of passwords or other private information that could be requested in such forms. The framed content 416 of FIG. 4 shows web content that can only be accessed after submitting a username and password to the specified site (corresponding to 620 of FIG. 6).

Figure 7:
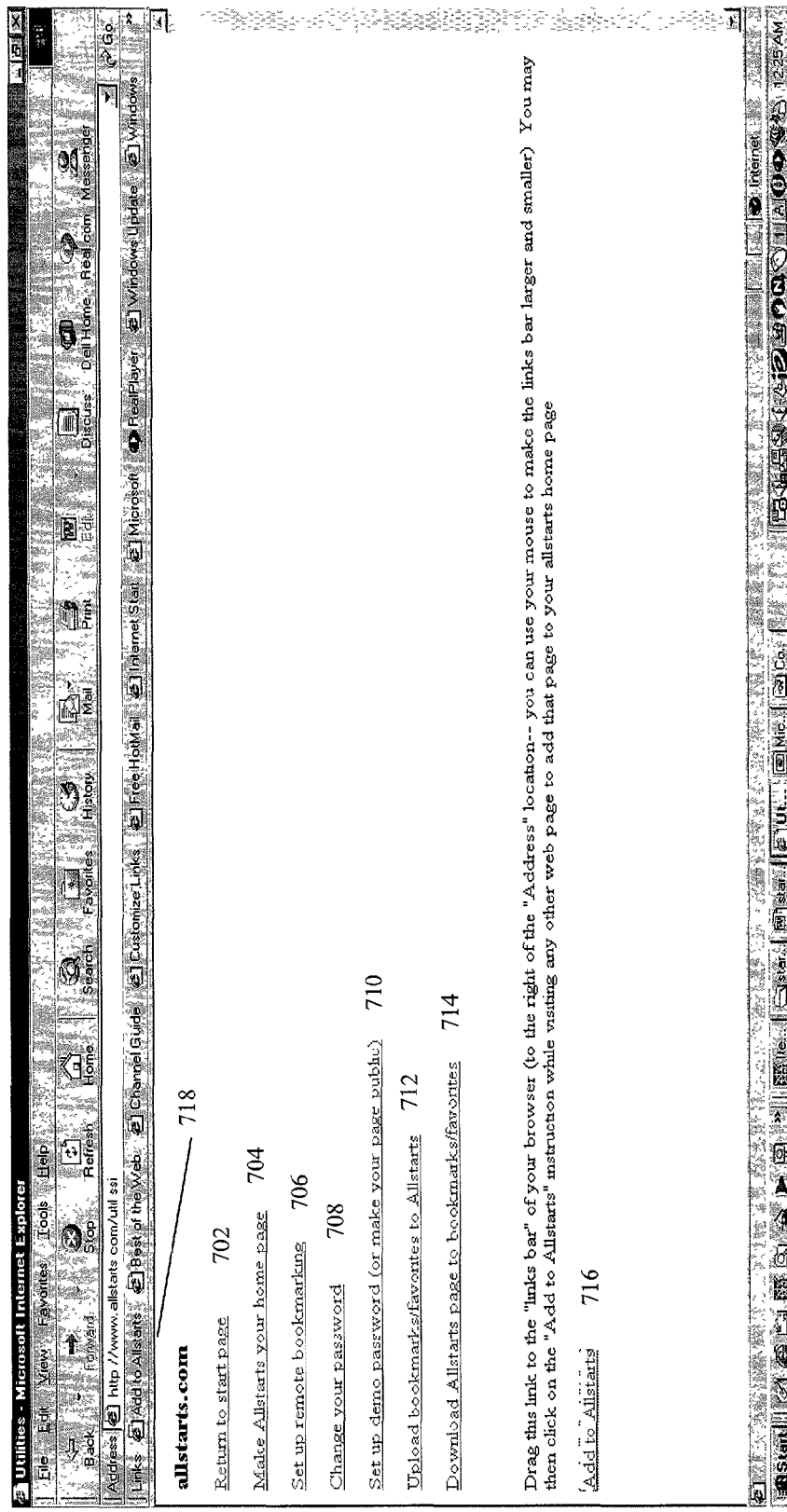
FIG. 7 presents a flowchart, demonstrating steps that may be taken by an embodiment of the invention when adding a link or frame to a start/portal page while viewing the target web page.

In a preferred embodiment, the user has additional options displayed in FIG. 7. These options include automatically providing the browser with the information necessary to make a start/portal page of an embodiment of the invention the browser's default home page 704, changing a password 708, setting a demonstration password 710 (such that viewers who know the demonstration password may view but not change items on the start/portal page), or making the page public 710 (such that any Internet user may access but not change items on the start/portal page). In some embodiments, users can use pages that have been made public as the starting point for their own start/portal pages.

In one embodiment, the user may exchange items on her start/portal page with items stored in a local browser as favorites or bookmarks. Thus, items on a start/portal page may be downloaded into bookmarks or favorites, and items in bookmarks or favorites may be uploaded into the start/portal page. This function may be accessed via a menu such as that shown as 712 or 714.

One embodiment of the present invention enables a user to add a link (or a frame) to another web site to her customized start/portal page with a single click while visiting said web site. This function is referred to as "remote bookmarking" 706. This process is also described in the context of FIG. 2. Although it is possible to add web sites while browsing the Internet with currently available browsers to a list of "bookmarks" or "favorites", these selected links are not available to the user from any browser anywhere on the Internet. Thus, a user who performs office-related research at home might wish to be able to access interesting sites identified at home from the office. It is very useful for a user to be able to add links to these sites to a start/portal page that is available from both locations. In one embodiment, the user can add a link (or a frame) to a web page being viewed with a single click. This may be implemented by a programmer with ordinary skill by providing a "bookmarklet" that sends a server information about the page to be added as a parameter associated with a link to a web page associated with an embodiment of the invention. Thus, the user is provided with a procedure for creating an "add to start/portal page" icon (depicted in FIG. 7 as 718 "Add to Allstarts") on his browser tool bar. When viewing a web-page, clicking the "add to start/portal page" icon will invoke the bookmarklet encoded by the link 716, which will automatically add a link to the web page to the user's start/portal page and return immediately to the page being viewed. From the user's perspective, the user has not left the site of the web page that he was viewing. In an embodiment, this "bookmarklet" is encoded in javascript, and redirects the browser to a prespecified web page associated with an embodiment of the invention, which has the purpose of handling remote additions to the start/portal page. Parameters that provide information about the page to be linked to are also passed to the server via access to this web page. Information about the user may be provided as a cookie that is submitted to the server. Using this information, the server creates a new record in the database corresponding to the new "link", and the browser returns to the page from which the bookmarklet was invoked. In a preferred embodiment, because these steps all occur automatically once the "add to start/portal page" icon 718 is clicked, the user is returned directly to his original Internet location. In some embodiments, this effect may also be programmed by a bookmarklet that opens a new browser window, which sends the desired information to the server of the invention. After this information has been received by the server, this window closes itself, so the user never departs from the original web site, but may notice the ephemeral creation of the new window. Other methods of supplying this information to the server, including temporarily saving it on the user's computer and submitting it later, or using another program to submit the information outside of the context of the browser also fall within the scope of this description. In alternative embodiments, the user may confirm the desire to add the link or provide additional information about the link (for example, desired name for the link, descriptive information, whether or not it is to be framed, etc.) prior to returning to the original browsing location. The link that has been added to the start/portal page typically carries the name assigned to it by the creator of the web page, and the user, upon his next visit to his start/portal page, has the option of editing the link to name it according to his own preferences, by following the normal procedure for modifying a link.

In one embodiment, a user may view the collective experience of other users of the start/portal page service to provide information regarding the most useful material to place on her start/portal page. Presumably, specific links are selected for display on a start/portal page by users in accordance with their utility to those users. Links that are selected by more users are more likely to be of use to another user. In one embodiment, the web site permits a user to view an index of web sites linked to by the community of users of the start/portal page web site. Web sites may be ranked within this index based on the number of links to them, the number of times the links have been displayed over a specified period of time, or the number of times the links have actually been used by members of the start/portal page web site community. This information is likely to be of significant value to each member of the community. In one embodiment, this index of web sites is also categorized, such that web sites within given categories are ranked based on their utility to users of the start/portal page web site community.

Figure 8:
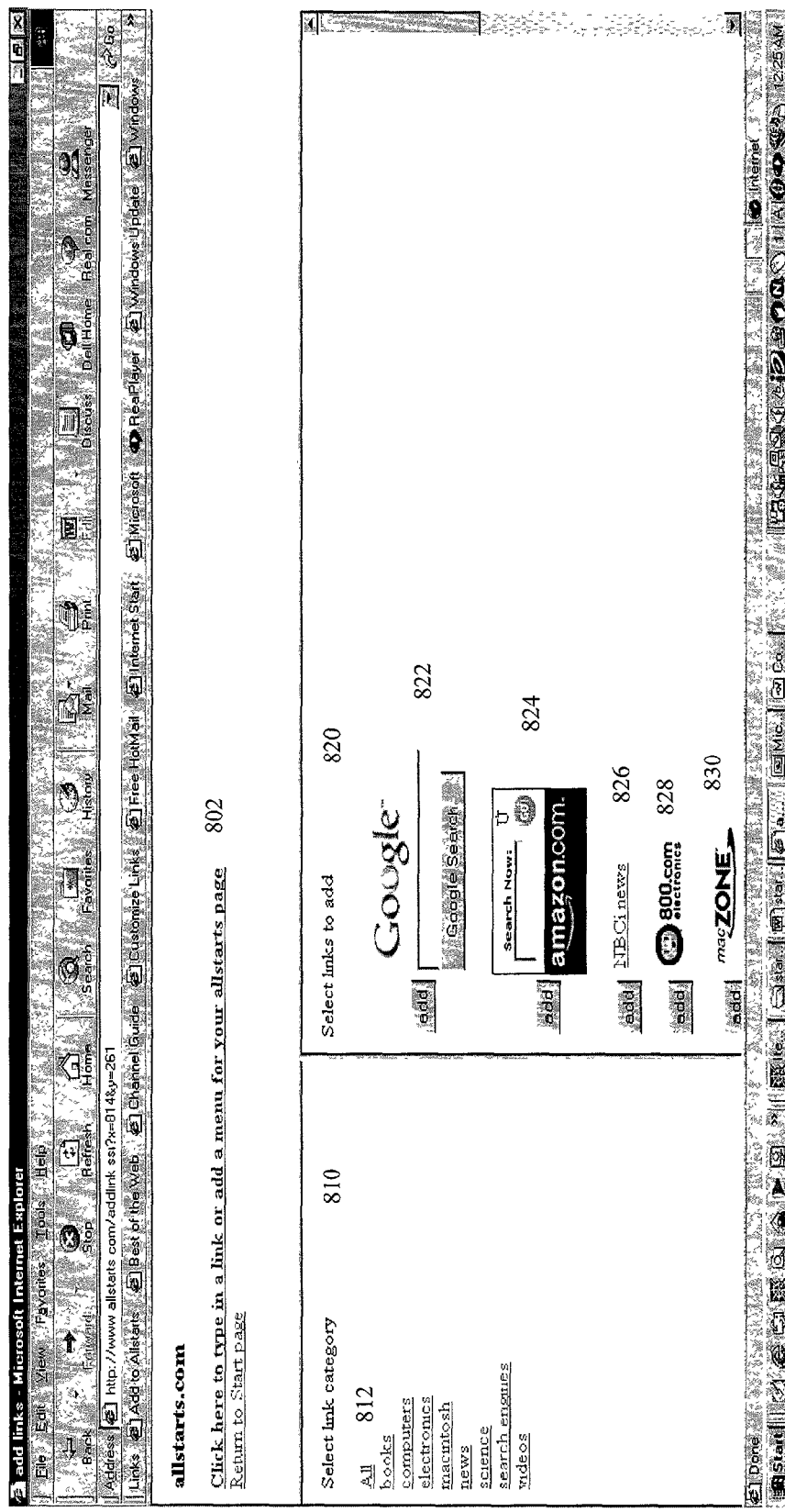
FIG. 8 presents an Internet index to various sites ranked based on their popularity among users of the start/portal page service of an embodiment of the invention.

FIG. 8 shows a listing of links that may be directly added to a start/portal page, ranked by their popularity among users of the start/portal page service (as measured, for example, by frequency of appearance on start/portal pages, frequency of use, frequency of clicks, or other measures of usefulness as may be obtained by the invention's server). These links may be categorized as shown in frame 810, and listed in a separate frame 820 in order of their popularity. Links (822-830) may then be added to a user's start/portal page by selecting the "add" button corresponding to the desired link. In this example, links of "all" categories 812 are shown.

Figure 9A:
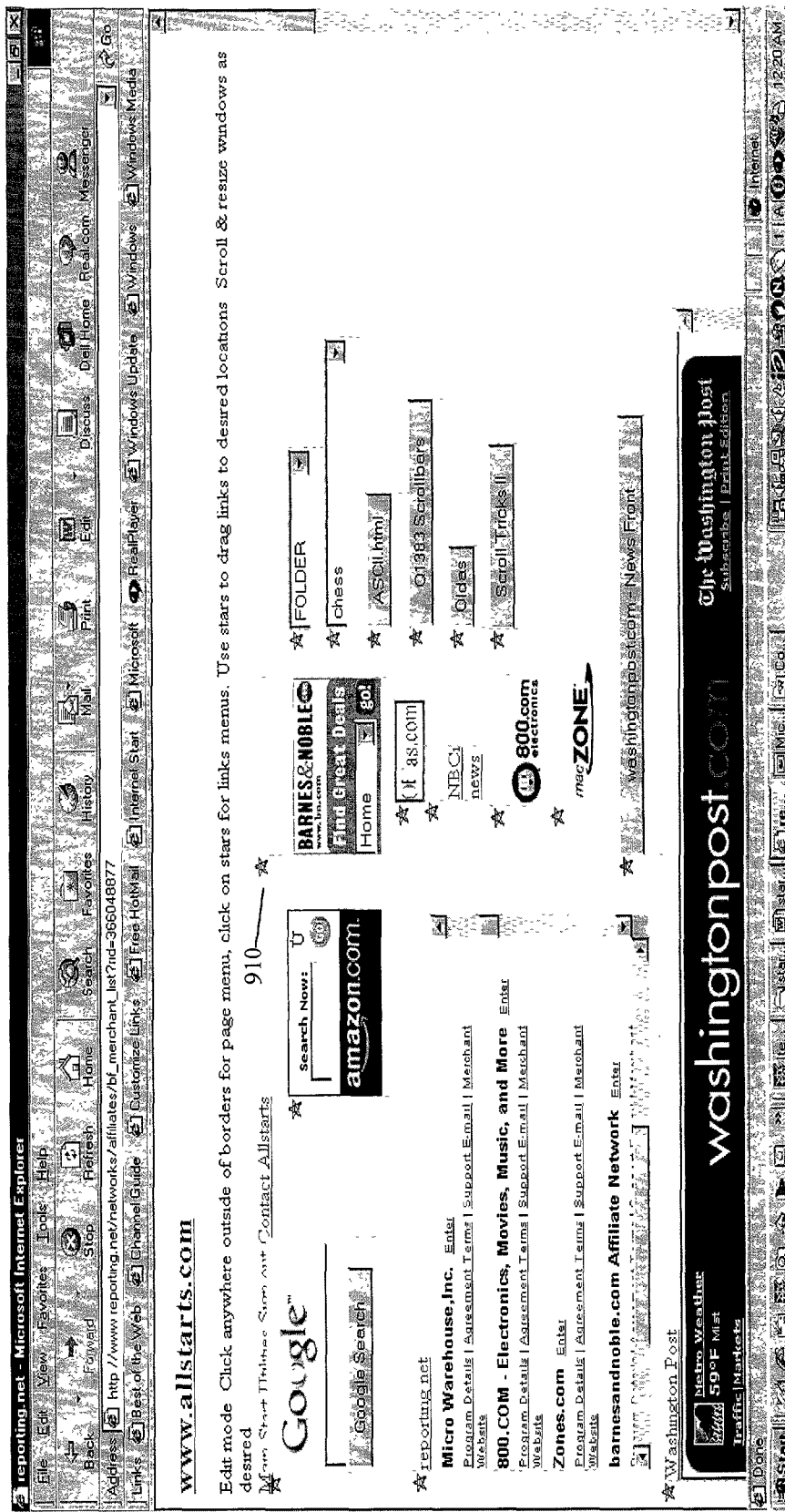
FIGS. 9a-9c present a graphical interface that permits the user to move and change links and frames presented on a start/portal page in an embodiment of the invention.
Figure 9B:
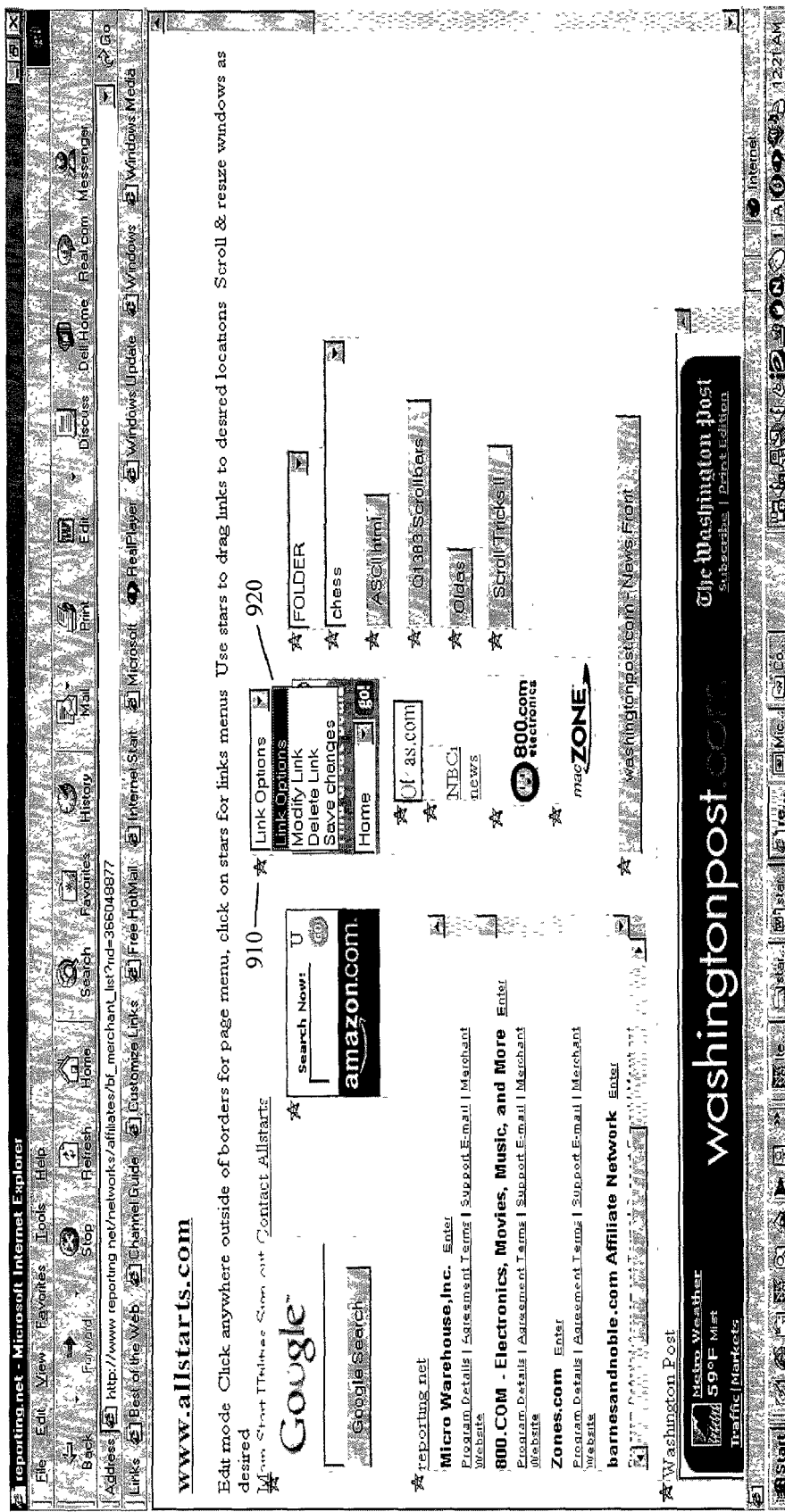
Figure 9C:
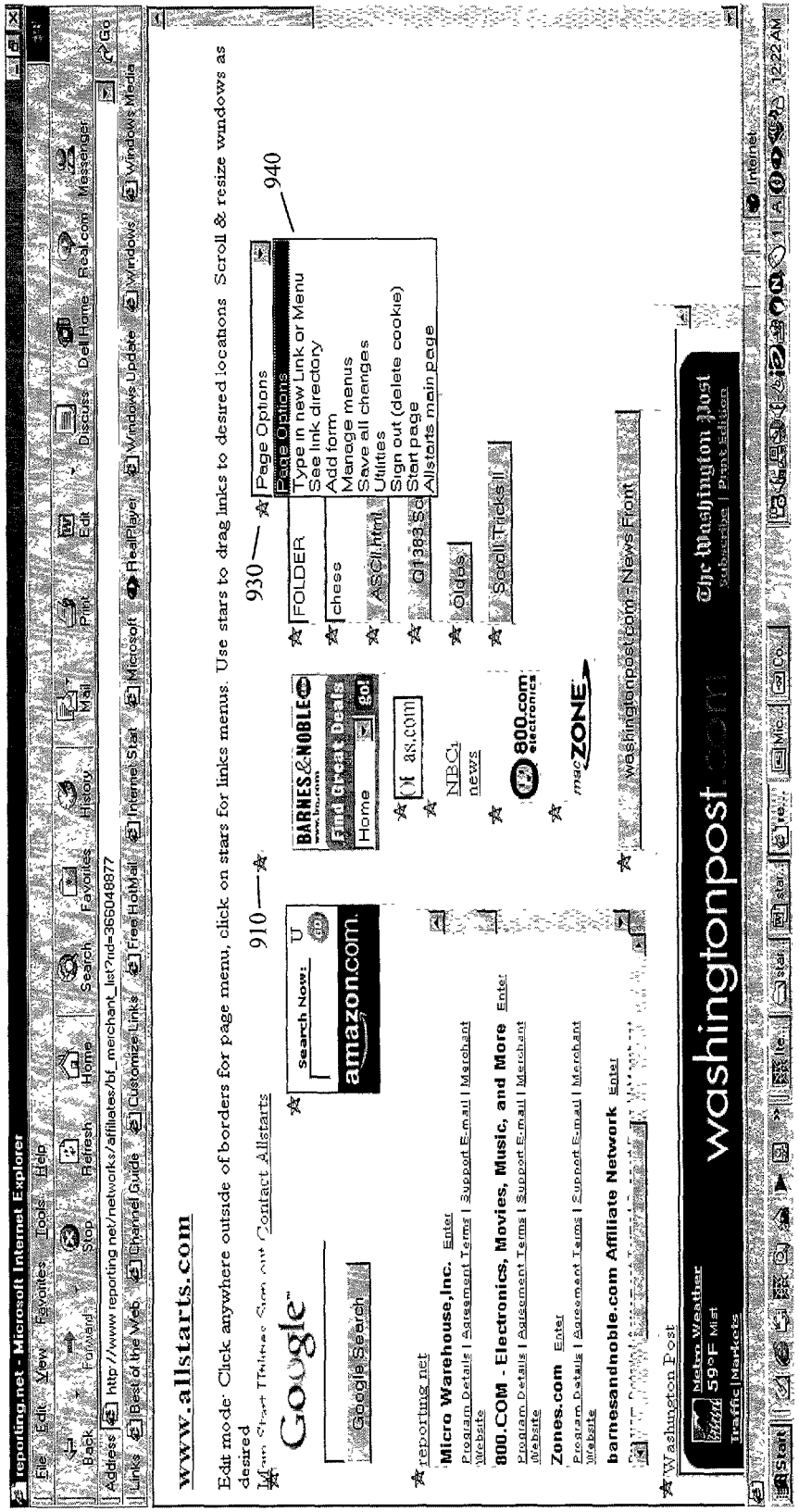

In one embodiment, a user may change the layout and contents of her start/portal page via the web site. Via a graphical interface, using a combination of mouse clicks and drag-and-drop operations, the user may move links and frames to desired locations on the start/portal page. A web page that provides this functionality is shown in FIGS. 9a, 9b and 9c. Any of the links on this page may be moved by dragging and dropping the associated star 910 to a new location. Clicking on the associated star 910 provides access to a drop-down menu (FIG. 9b, 920) that permits aspects of the link to be changed, or the link to be deleted. Clicking in a blank area of the page (FIG. 9c, 930) provides access to a different drop down menu (FIG. 9c, 940) that provides access to more general functions, including the ability to add a new link at the clicked location. New links may be added to the start/portal page either by typing in the relevant information (as shown in FIG. 5, accessed via menu 940 of FIG. 9c or link 802 of FIG. 8) or via an automated method as described above, e.g., the Add to start/portal page link described in connection with FIG. 7). Links or frames may also be deleted from the start/portal page via mouse clicks, and the decision to frame a web page also may be indicated via a mouse click. Thus, the functions demonstrated in FIGS. 5, 6, 7 and 8 may be accessed via a menu such as 940, while a menu such as 920 may be used to access the functions demonstrated in FIG. 10.

Figure 10:
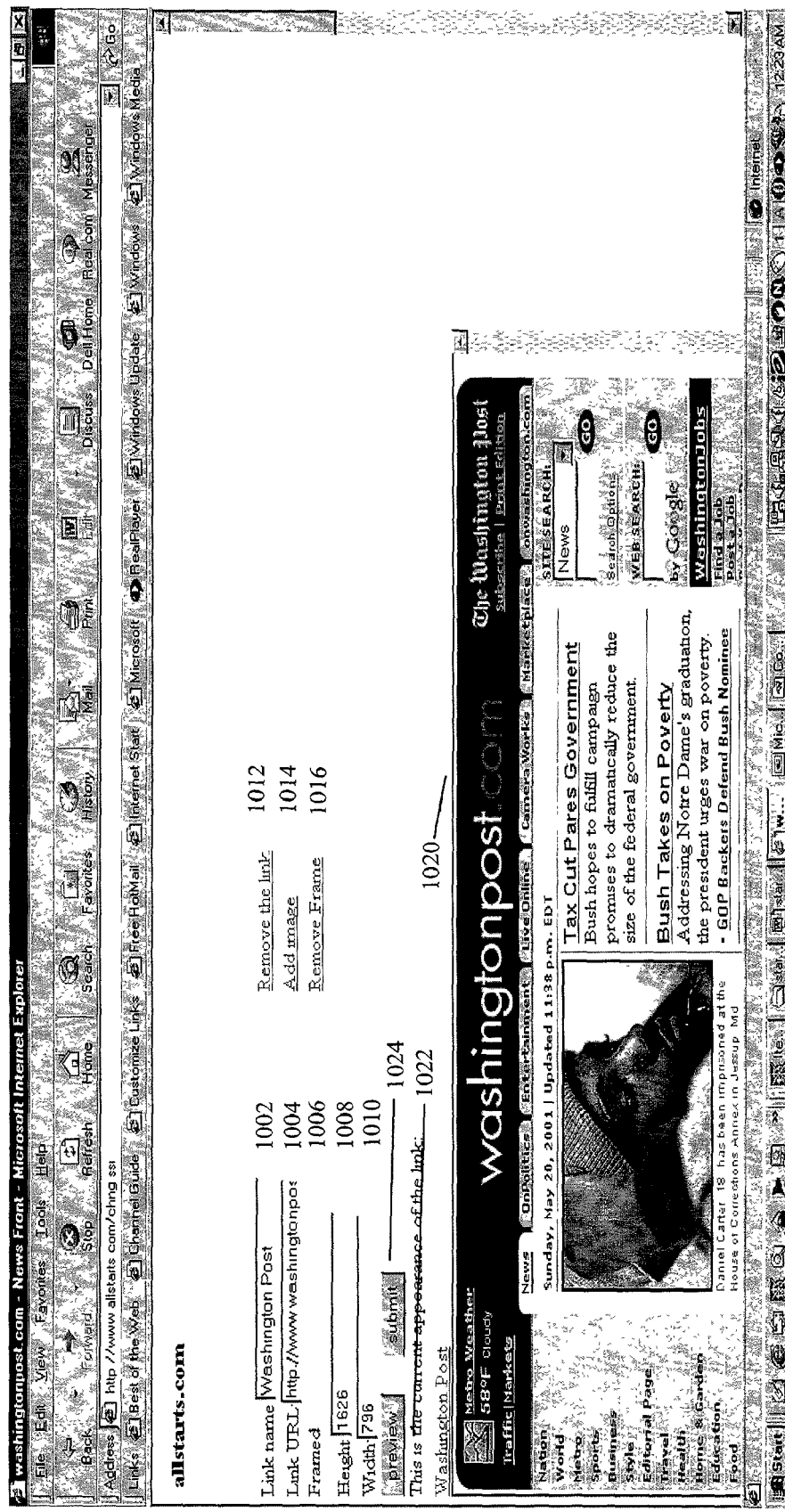
FIG. 10 shows a page that permits detailed specification of the parameters associated with each link or frame in an embodiment of the invention.

FIG. 10 provides examples of mechanisms by which content displayed on a start/portal page may be modified, in a preferred embodiment. The description of this page parallels the mechanism for specifying information about a new link (as shown in FIG. 5), with the difference that this page begins with information about the existing link already filled out. This web page accepts changes to the name by which the link is known 1002 (corresponding to 308), the uniform resource locator corresponding to the link 1004 (corresponding to 310), and information about the height and width of an associated frame or image (1008 and 1010, corresponding to 316 and 318). Further options such as 1014 specifying an associated image, 1012 removing the link (such that only text specified by Link name 1002 is displayed at this location on the start/portal page), and 1016 Adding or removing frames are also provided. By selecting preview 1022, the actual appearance of the specified link (1020) on the start/portal page may be viewed. If material is framed as a part of the link, it may be pre-scrolled by moving the horizontal and vertical scrollbars shown in the window 1020 to the desired position. Frames or images may also be resized either by typing in numeric values for height 1008 and width 1010, or by dragging a resize icon (below the scrolled area in this example) to indicate a desired height and width (in which case the numeric values of height and width are recalculated to correspond to the height and width of the previewed frame).

In one embodiment, the operator of the web site is provided with an opportunity to earn income based on referral of users to e-commerce and other sites that participate in affiliate programs. One substantial disadvantage of currently existing e-commerce affiliate programs is that the referring web site only is paid if the purchaser actually completed the purchase as a result of a referral from said web site. Many users may follow a link to an e-commerce web site initially, and identify the product they are interested in buying, but may later visit the site independently of the original link, thus preventing the referring web site from being paid. By permitting the user to place links directly to e-commerce web sites of interest on her start/portal page, this invention increases the likelihood of a purchase being completed on a visit to the e-commerce site that was initiated by one of these links. Moreover, by enabling links to web pages to be placed directly on their start/portal page, the likelihood that a purchase is made after a referral from the start/portal page web site is greater. Moreover, in one embodiment, if a link to a web site with whom an e-commerce or affiliate agreement exists is added to a start/portal page, the web site software automatically replaces this link with a link that provides the e-commerce site with information necessary to identify the start/portal page web site as the referring site, enabling the referring site to be compensated for the referral. In one embodiment, from the user's point of view, this replacing link might not send the user to precisely the same location in the linked web site.

In one embodiment, the operator of the web site has an opportunity to target advertising to users, based on the interests they have indicated through their choice of links and frames to place on their start/portal page. It is anticipated that users who are interested in making certain types of purchases will be more likely to place links to sites associated with those purchases on their start/portal pages. For example, a user who is in the market for a car may place links to Internet car sites on her start/portal page. This information could be used to target advertisements from car manufacturers directly to this user without disclosing any private information about the user to the advertiser. Methods of targeting advertising based on user choices on the Internet are well-known in the art and could be implemented in conjunction with the present invention.

In one embodiment, the operator of the web site may collect revenue from users based on services provided in the context of the invention. Some services may be free, and a higher level of service (for example, the ability to access certain more useful features, or to store larger pages) may require payment of fees. Other ancillary services, such as e-mail, instant messaging, file storage, chat rooms, or bulletin boards may also be provided in the context of the invention, and may provide opportunities for the operator to collect fees.

In one embodiment, the invention contains mechanisms to classify the links on start/portal pages based on characteristics of the users. These characteristics may be determined using user-provided information, or may be inferred (either by the invention or by review of a human expert) based on the selection of links. For example, users who include numerous links to hip-hop sites might be inferred to be young urban males, and this inference could be used to target further advertising to these individuals, even though that advertising might be irrelevant to the hip-hop community. This information also may be used to customize a directory of links that could be of particular interest to users who are members of a specific community.

In one embodiment, the invention provides different starting points for members of different communities, enabling individuals to customize start/portal pages that originally contain some links of interest to them. For example, pages might be originally set up to appeal to members of ethnic or age groups, people seeking to purchase various items (such as homes, cars, or computers). In addition, users themselves may choose to make public start/portal pages that they have created that they believe will be appealing to members of specific groups. Users are able to further customize these start/portal pages to their own needs, but such pages provide users with important information regarding their specific interests and simplify the task of creating a complete customized start/portal page.

The described start/portal page can readily be tailored to meet the needs of a specific corporation or business. Businesses may in fact design customized start/portal pages according to this invention and provide them to their employees, or make them available to their customers. Such customized start/portal pages may include access to other relevant Internet sites, to intranet sites, to discussion groups relevant to the business, or to shared research on topics important to the business.

In some embodiments of the invention, it is not critical that the user select a website of this invention as his start page. Rather, the user can create a portal page using the above-described tools and having the functionality described above, but need not specify that the page be made his start page. For example, the ability for a single user to use a website of this invention to create multiple pages containing links, using the remote bookmarking ("add to start/portal page," depicted in FIG. 7 as 718 "Add to allstarts") feature of the invention, yields significant benefits for an individual or individuals pursuing research projects, regardless whether or not the individual selects the website as his start page. Thus, an individual preparing a paper on the Renaissance can create a "research page" named "renaissance research" just for that project. While doing web-based research, the individual can use the remote bookmarking feature to add a link to a useful webpage to his or her research page. Because the research page is stored on the world wide web, when resuming work on the project in a later session, or from a different computer, the user has ready access to the saved links. Similarly, when presenting his work to a supervisor for review, the user can provide the supervisor with easy access to his Internet sources merely by providing the supervisor with access to the research page.

In some embodiments of the invention, the remote bookmarking feature further provides the user the ability to choose a name and provide a description for the button that will represent the link that he is adding to his start/portal page. In some embodiments, after clicking on the remote bookmarking button on his browser bar, the user is prompted to (1) choose a name for the button, and (2) provide a brief description of the website that is being linked to. On the webpage, the link will then appear as a button with the name that the user has given it, and the description that the user has provided will be readily available, for example by a mouseover of or a right-click on the button. The ability to add a description of a link in this manner is particularly important where (as discussed further below) a plurality of individuals are working on and from the webpage.

In some embodiments, the user has the ability to set the remote bookmarking to complete the bookmarking process with a single click (i.e. without requesting any information from the user), or to set the remote bookmarking to request the name and description information from the user. In some embodiments, the name of an added link can be changed, and a description of the link can be added, using the modify link option.

In some embodiments, where the user believes that his research will have broad appeal to other users, the user can elect to make public the portal page created in the course of his research. Thus, someone doing research on cures for headlice, or divorce, or the best places on the Internet to buy used books, or to learn about or play chess, etc., can create a public portal page accessible to any other user. In a preferred embodiment, the user chooses a name for the page, and is also required to provide a brief description of the purpose of his research, and can optionally provide additional information, including the creator's e-mail address. In some embodiments, public portal pages created by users are indexed by the names given to them by the users; in other embodiments, the website provider can review the site and select a name that conforms to the structure of an index of the public portal pages maintained by the web-site provider. Users visiting the website of the invention thus have access to an increasing store of public portal pages, each with a descriptive title, brief description, and an indication of the date of creation or last use, and, in some cases, an email address for the creator that might be useful in creating a connection between individuals with similar interests or research needs. As mentioned, the public portal pages may be indexed either automatically or with intervention by the web-site provider, to make it easier for a user to find a web-site related to a particular topic. Such an index can be searchable, and can have any other functionality of electronic indexes known in the art. In some embodiments, a user search of the index searches the visible index headings, as well as the descriptions of research issues entered by the page creators (which may or may not be visible on the index), and/or the user-entered descriptions, names, or URLs of the links of the portal page (which also may or may not be visible on the index). Users accessing such public research pages cannot edit the pages themselves, but can create copies of the pages and add links to these copies. In a preferred embodiment, such copies are assigned names based on the name of the original page (for examples, "lice mod1", etc.), and thus are indexed in a location near the original page. In one embodiment, a user creating a public portal page waives any and all copyright rights in the page.

Due to the ever-changing nature of the Internet, links that are added on one day might not be operable on future days. In some embodiments, the content of a linked web-page may be stored or cached by the web-site of the invention, in order to enable continued access to the page. The ability to provide this feature or the method of providing it may depend on local copyright laws—in some countries, it may be necessary to obtain the permission of the linked web-site before caching or storing its content. In another embodiment, links on start/portal pages are tested by the server, and if found to be inactive, are flagged to the user to indicate this.

In some embodiments, user-created start/portal pages can have chat-rooms or discussion threads associated with them, to provide the user the ability to post comments or questions to be addressed or answered by either the creator of the page, or by other users with similar interests.

The remote bookmarking feature of the invention can also be used to enable a plurality of users to store their Internet research links on a single cooperatively-created web page ("cooperative web page"), accessible to each user. In one embodiment, a user can create and name a cooperative web page, and arrange that one or more other users have "read/write" access to the cooperative web page, in some embodiments by virtue of a login name and password. Thus, a user might create a cooperative web page called "Renaissance Research," and, in addition to his own login, create logins for a plurality of his colleagues, friends, or coworkers. In some embodiments, the user selects the initial passwords for his fellow users; in other embodiments, they are prompted to select passwords after they input their login names. When all of the users have access to the cooperative web page, each one of them can use the remote bookmarking feature to add links to the same start/portal page. In some embodiments, links added by different users are uniquely presented such that a user can easily determine which other user created a particular link. For example, each user might have a particular color, geometric shape, shading, writing style, font, text or other label, or button style associated with him, or each user's buttons might appear only in a section of the screen associated with that user. In some embodiments, users collaboratively working on a document or other computer encoded material may store that document or material on the server of the invention, and that document or material may be made available on a web page of the invention for collaborative work.

Figure 11:
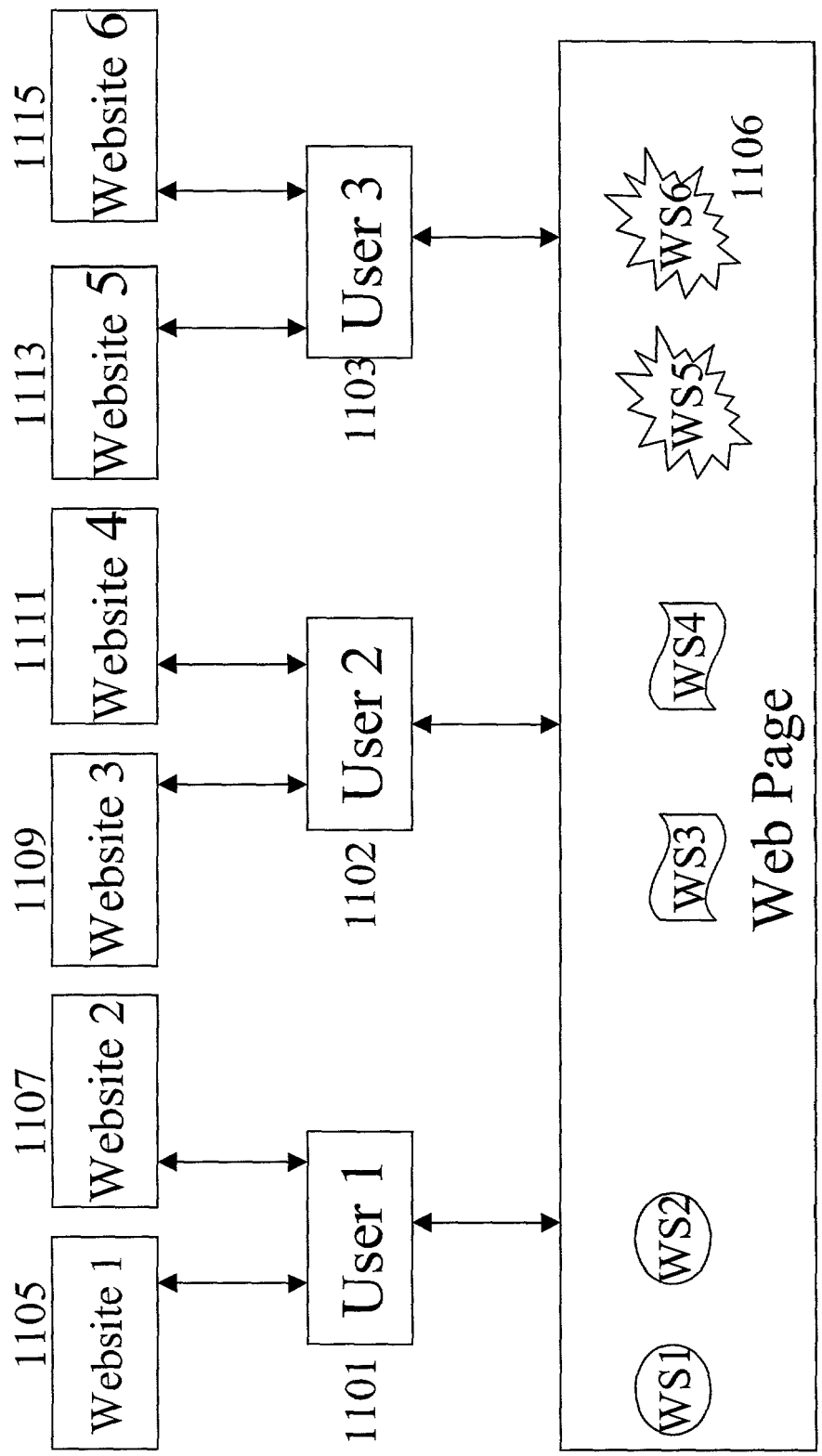
FIG. 11 demonstrates how multiple users can collaborate to collect relevant links on a customizable start page or portal page of an embodiment of the invention.

A block diagram depicting the creation of a cooperative web page as described above is shown in FIG. 11. Three users—User 1 (1101), User 2 (1102) and User 3 (1103)—all have access to cooperative web page 1106. Each user visits two different sites, and when visiting those sites, employs the remote bookmarking feature to add links to those sites to cooperative web page 1106. As depicted in FIG. 11, links to websites added by different users are uniquely displayed by using different shapes for different users. In an alternative embodiment, links added by different users may be displayed in different colors or in different menus.

In some cases, users will create menus on the cooperative web page that correspond to particular subtopics of the overall topic, and collect links relating to a given subtopic in the appropriate menu. The net result is that for any collaborative project for which the Internet is useful, a set of fellow users can easily create a set of links, accessible only to that set of users, to Internet resources relevant to the collaborative process.

In embodiments where users are encouraged to create multiple pages, as, for example, to create research pages or cooperative web pages in addition to start pages, the website can generate a revenue stream by providing each user with one "start/portal page" or other customized page for free, but stipulating that additional pages can only be created for a small fee. As Internet electronic money models such as digicash, millicent, and e-cash gain acceptance among users, users will increasingly be willing to pay a small sum for the functionality provided by the invention.

In a preferred embodiment, users also have the capability of using a portal page for additional types of collaborative work. This may include word processing, spreadsheet calculating, drawing, computer programming, or any function that works with electronic media (that for the purpose of this description are referred to as documents). This feature permits a central document to be stored on a server with access to a shared network, such that the steps necessary to implement the described functionality are all encoded within web pages that can be executed by an Internet browser. Thus, users of this feature do not need to explicitly install any additional software on their computer, because the word processing, spreadsheet, drawing, etc. programs are centrally served via a web page that is interpretable by a browser. All information associated with the collaborative document is also stored on the server of the invention, such that updates from one user become rapidly available to other collaborators. In a preferred embodiment, documents, spreadsheets, drawings, or other material for collaboration may be pasted directly into the browser via a user's computer's clipboard, such that it then becomes available to the other collaborators. In one embodiment, a program that converts various document formats to other formats or a single standard format is also provided within the web page. In a preferred embodiment, these features are encoded as Java and javascript programs associated with an Internet web page. Thus, all changes to the collaborative document are made by collaborators who use browsers on their own computers that display the harmonized document. In some embodiments, the harmonized document may include multiple potential versions with each user's comments displayed in a manner distinct from other users' comments, while in other embodiments, the harmonized document includes only a single final version that incorporates all comments. In a preferred embodiment, collaborative documents also permit individual users to reserve sections of the document to work on, such that other users may not work on those same sections at the same time, avoiding conflicts that could arise from permitting multiple changes to be made simultaneously by multiple users.

It will be apparent to those skilled in the art that the invention described herein is not limited to the specific preferred embodiments discussed above. For example, the discussion also applies to other networks besides the Internet, and includes the use of links and material that may be stored anywhere on a network, or even on the user's own computer. Moreover, although the discussion describes programs using a mouse, keyboard, and display on a Windows™ platform, those skilled in the art will recognize that the invention could also be practiced with input devices such as trackballs, joysticks, styluses, light pens, mouses, voice recognition systems, touch-sensitive display panels and the like, and could also be usefully implemented on any operating system with any browser, including platforms such as Macintosh, X-Windows, NextStep, OS/2, Motif, Unix, Linux, Mac OS X, WebTV, PalmOS and the like, and including browsers such as Netscape, Opera, I-Cab, Mozilla and the like. This capability extends to future versions of such operating systems and browsers. The utility of a customizable start page or portal page is not either limited to video displays, but also can be practiced using devices that provide hard copy, audio, olfactory, tactile, or other sensory output to the user. In addition, it will also be apparent to those skilled in the art that embodiments of this user interface which provide results equivalent to those obtained using the methods described above also fall within the scope of this invention and claims. This invention also may be practiced on stand-alone machines constructed for this purpose, or on variants of computer systems, such as personal digital assistants, cellular telephones, and the like. Moreover, those skilled in the art will recognize that this invention or parts of this invention could be practiced using computer hardware, bypassing the use of software for the purpose of providing the functionality of this invention. Furthermore, those skilled in the art will recognize that this invention may be practiced as a part of any computer program which displays Internet content and links, as defined broadly herein, including but not limited to browsers, word processors, text readers (including those which audibly read text) and other text or graphics display programs. It will also be apparent to those skilled in the art that various modifications can be made to this invention of a customizable start/portal page without departing from the scope or spirit of the invention and claims, including use of different parameters in the setup process. It is also intended that the present invention cover modifications and variations of the described user interface within the scope of the appended claims and their equivalents.

I claim:

1. A computer-implemented method of adding an indicator of network-accessible information to a network-accessible display page, comprising in sequence, the steps of:
   a) providing components including a computer program, such that after said computer program is invoked by a user clicking on an element within an internet browser, a link to the web page currently displayed in said browser is added to an internet-accessible display page, said display page not comprising said web page and said components comprising:
      i. a server computer that provides, via the internet, the contents of at least one display page, wherein:
         A. said display page is displayed in a network browser window;
         B. said display page is accessible via a uniform resource locator;
         C. said display page contains a plurality of links to internet web sites;
         D. at least one link presented on said display page can be automatically changed using instructions sent over the internet from an internet browser; and
         E. the contents of said display page are stored on computer readable storage media accessible to said server computer at a first network location;
      ii. a computer program wherein:
         A. said program is provided via the internet, to a client computer at a second network location distinct from said first network location;
         B. said program can be associated with a network browser window;
         C. said program can be invoked by a single mouse click on a toolbar of a network browser;
         D. when invoked, said program causes information in a pre-specified format to be sent over the internet to a server computer at a pre-specified network address, said information comprising:
            1) information sufficient to identify the network address of the web page currently displayed in the browser window associated with said computer program, wherein said web page is served from a third network location distinct from said first network location and second network location; and
            2) information sufficient to identify said display page of step; and
      iii) a computer program different from that described in step (a)(ii), wherein:
         A. said computer program is executed after receipt of said information of step (ii)(D) via a computer network by a server computer at said pre-specified network address of step (ii)(D);
         B. said computer program can access the computer readable storage media of step (i); and
         C. when a computer executing said computer program receives, via the internet, input information in the pre-specified format of step (ii), the contents of the specified display page are modified to include a link to the network address of the page being browsed in step (ii)(D)(1); and
   b) providing, via the internet to a client computer different from that of step (a)(ii), a modified display page that includes the link added to said display page as a result of step (a).

2. The method of claim 1, wherein step (a)(iii) further comprises modifying the contents of the specified display page to include a location for display of the link to the network address of the page being browsed in step (a)(ii).

3. The method of claim 1, wherein said display page comprises information stored on a plurality of network servers located at a plurality of network addresses.

4. The method of claim 1, further comprising the step of providing access from said display page to a file uploaded by a user to said first network location.

5. The method of claim 1, wherein said link comprises a picture.

6. The method of claim 1, wherein said visual indicator comprises a drop-down menu.

7. The method of claim 1, wherein said information of step (b) comprises the contents of a text box in which a user may type information for submission to said web page.

8. The method of claim 1, wherein links displayed on said display page as a result of action by different users are distinguished on said display page by differences unique to each user.

9. The method of claim 1, further comprising providing a user of a client computer at the ability to change the specific screen location at which said link is displayed on said display page, while said user is viewing said display page via the internet on said client computer.

10. The method of claim 9, wherein the specific screen location of said visual indicator may be changed by dragging said link from an original screen location to a new screen location.

11. The method of claim 1, wherein said information of step (a)(ii) includes additional user-supplied information related to said web page; and wherein said additional information is used in step (a)(iii) to further modify the contents of said display page.

12. The method of claim 11, wherein said additional user-supplied information comprises a textual entry associated with said web page.

13. The method of claim 11, further comprising modifying the contents of said display page such that said additional user-supplied information is made accessible via a mouse-over of said link.

14. The method of claim 11, further comprising modifying the contents of said display page such that it includes visual cues that distinguish additional user-supplied information contributed by different users.

15. The method of claim 11, wherein said additional user-supplied information comprises audio information.

16. The method of claim 11, further comprising modifying the contents of said display page such that said additional user-supplied information is displayed on said display page.

17. The method of claim 1, wherein said computer program of step (a)(ii) is configured to be invoked by a single mouse click.

18. The method of claim 17, wherein said computer program of step (a)(ii) is configured to be invoked by a single mouse-click on a toolbar component of said browser of step (a)(ii).

19. The method of claim 1, wherein said link comprises a display of a web page served from said third network location within a frame on said display page.

20. The method of claim 19, wherein said frame contains at least one scroll bar.

21. The method of claim 19, further providing a user the ability to resize said frame while viewing said display page.

22. The method of claim 19, further comprising modifying the contents of said display page such said frame is pre-scrolled to a pre-specified, non-default location wherein said pre-specified, non-default scroll location is stored in said computer-readable storage media of step (a)(i).

23. A computer memory storage device encoded with a computer programs for adding an indicator of network-accessible information to a network-accessible display page comprising:
 a) means for providing components, including a computer program, such that after said computer program is invoked by a user clicking on an element within an internet browser, a link to the web page currently displayed in said browser is added to an internet-accessible display page, said display page not comprising said web page and said components comprising:
  i. a server computer that provides, via the internet, the contents of at least one display page, wherein:
   A. said display page is displayed in a network browser window;
   B. said display page is accessible via a uniform resource locator;
   C. said display page contains a plurality of links to internet web sites;
   D. at least one link presented on said display page can be automatically changed using instructions sent over the internet from an internet browser; and
   E. the contents of said display page are stored on computer readable storage media accessible to said server computer at a first network location;
  ii. a computer program wherein:
   A. said program is provided via the internet to a client computer at a second network location distinct from said first network location;
   B. said program can be associated with a network browser window;
   C. said program can be invoked by a single mouse click on a toolbar of a network browser;
   D. when invoked, said program causes information in a pre-specified format to be sent over the internet to a server computer at a pre-specified network address, said information comprising:
    1) information sufficient to identify the network address of the web page currently displayed in the browser window associated with said computer program, wherein said web page is served from a third network location distinct from said first network location and second network location; and
    2) information sufficient to identify said display page of step (a); and
  iii) a computer program different from that described in step (a)(ii), wherein:
   A. said computer program is executed after receipt of said information of step (ii)(D) via a computer network by a server computer at said pre-specified network address of step (ii)(D);
   B. said computer program can access the computer readable storage media of step (a); and
   C. when a computer executing said computer program receives, via the internet, input information in the pre-specified format of step (ii), the contents of the specified display page are modified to include a link to the network address of the page being browsed in step (ii)(D)(1); and
 b) means for providing, via the internet to a client computer different from that of step (a)(ii), a modified display page that includes the link added to said display page as a result of step (a).

24. A machine for adding an indicator of network-accessible information to a network-accessible display page comprising:
 a) means for providing components, including a computer program, such that after said computer program is invoked by a user clicking on an element within an internet browser, a link to the web page currently displayed in said browser is added to an internet-accessible display page, said display page not comprising said web page and said components comprising:
  i. a server computer that provides, via the internet, the contents of at least one display page, wherein:
   A. said display page is displayed in a network browser window;
   B. said display page is accessible via a uniform resource locator;
   C. said display page contains a plurality of links to internet web sites;
   D. at least one link presented on said display page can be automatically changed using instructions sent over the internet from an internet browser; and
   E. the contents of said display page are stored on computer readable storage media accessible to said server computer at a first network location;
  ii. a computer program wherein:
   A. said program is provided via the internet to a client computer at a second network location distinct from said first network location;
   B. said program can be associated with a network browser window;
   C. said program can be invoked by a single mouse click on a toolbar of a network browser;
   D. when invoked, said program causes information in a pre-specified format to be sent over the internet to a server computer at a pre-specified network address, said information comprising:
    1) information sufficient to identify the network address of the web page currently displayed in the browser window associated with said computer program, wherein said web page is served from a third network location distinct from said first network location and second network location; and
    2) information sufficient to identify said display page of step (a); and iii) a computer program different from that described in step (a)(ii), wherein:
- A. said computer program is executed after receipt of said information of step (ii)(D) via a computer network by a server computer at said pre-specified network address of step (ii)(D);
- B. said computer program can access the computer readable storage media of step (a); and
- C. when a computer executing said computer program receives, via the internet, input information in the pre-specified format of step (ii), the contents of the specified display page are modified to include a link to the network address of the page being browsed in step (ii)(D)(1); and b) means for providing, via the internet to a client computer different from that of step (a)(ii), a modified display page that includes the link added to said display page as a result of step (a).

\* \* \* \* \*